(No Model.)  2 Sheets—Sheet 1.

A. W. THOMAS.
VEHICLE WHEEL.

No. 399,362. Patented Mar. 12, 1889.

Witnesses
A. P. Blackwood
G. Smith

Inventor
Amos W. Thomas
by Connoly Bros
Attys (No Model.) 2 Sheets—Sheet 2.
A. W. THOMAS.
VEHICLE WHEEL.
No. 399,362. Patented Mar. 12, 1889.
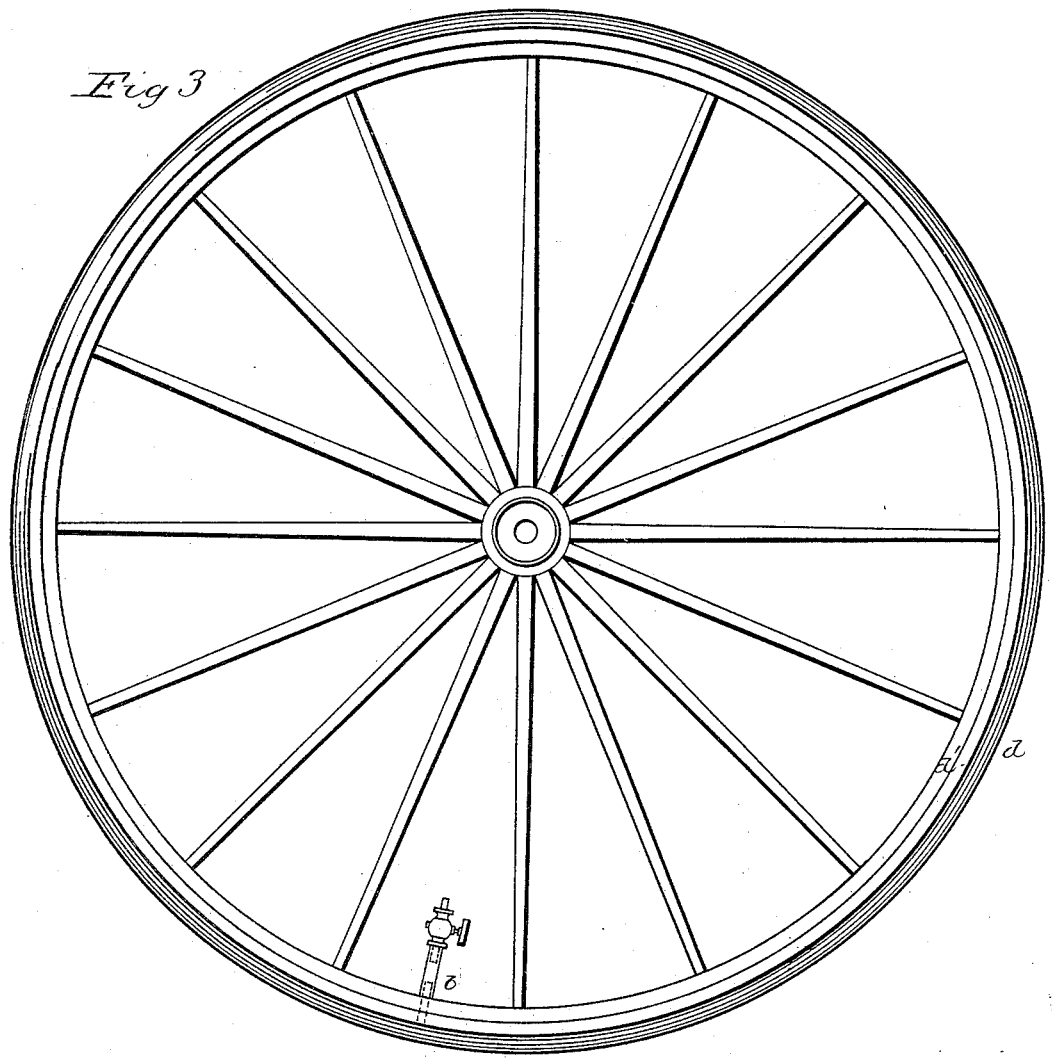
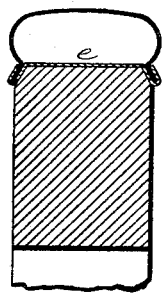
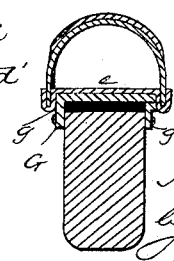

UNITED STATES PATENT OFFICE.

AMOS W. THOMAS, OF PHILADELPHIA, PENNSYLVANIA.

VEHICLE-WHEEL.

SPECIFICATION forming part of Letters Patent No. 399,362, dated March 12, 1889.

Application filed December 14, 1887. Renewed February 1, 1889. Serial No. 298,419. (No model.)

*To all whom it may concern:*

Be it known that I, AMOS W. THOMAS, a citizen of the United States, residing at Philadelphia, in the county of Philadelphia and State of Pennsylvania, have invented certain new and useful Improvements in Vehicle-Wheels; and I do hereby declare the following to be a full, clear, and exact description of the invention, reference being had to the accompanying drawings, which form part of this specification.

My invention has relation to the wheels of vehicles—such as bicycles, tricycles, wagons, carriages, and other rolling conveyances—and has for its object the provision of means for cushioning the tires, peripheries, or rims of such wheels, so as to render the same elastic or yielding to the pressure or impact of irregularities, projections, or obstacles upon the surface of the roadway and thus allow vehicles to travel with a smooth even motion and without jolting, jarring, or other like disturbing effect.

My invention broadly consists in the application to a vehicle-wheel of a hollow ring, tube, or band capable of being inflated, expanded, or filled with air, gas, or other suitable fluid in the form of liquid or gaseous vapor in such manner and under such conditions that the tube, ring, or band so inflated expanded, or filled will constitute a yielding or elastic tire which will adapt itself in rolling over the surface of a roadway to all minor irregularities and render the travel of the vehicle practically regular and correspondingly safe and comfortable.

My invention, as regards details of construction and mode of application and use, may be carried into effect in a variety of ways and under different conditions; but for the present it will suffice to describe only such features of construction and application as will convey a clear and definite idea of the invention in some of its forms and applications.

Other constructive features and special applications will constitute the subjects of separate patents, to be hereafter applied for.

The simplest application of my invention is to a bicycle or tricycle, as such vehicles are already provided with elastic tires, which, however, are primarily intended and adapted to increase the traction or frictional contact of the wheels with the surface of the ground and prevent slippage.

Figure 1:
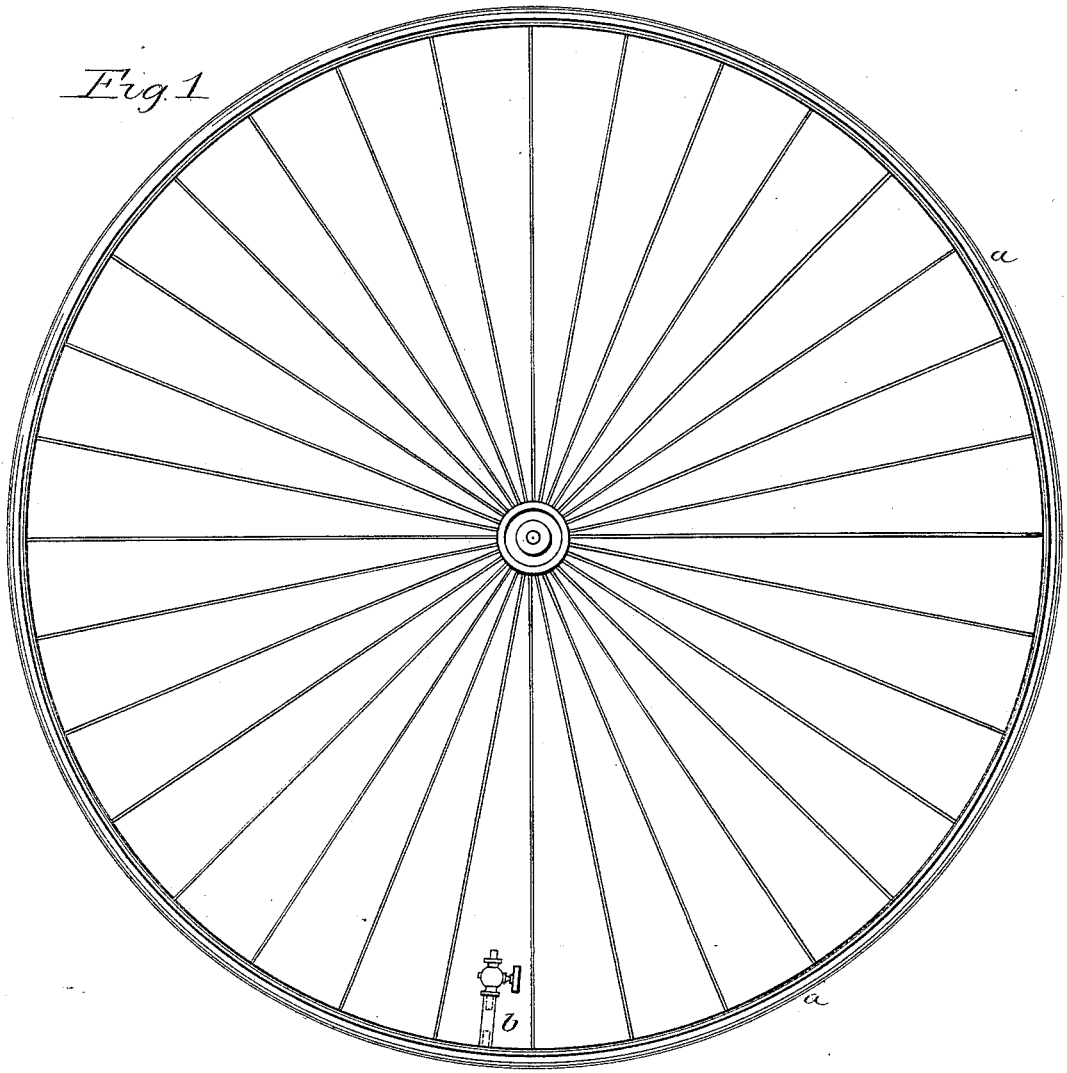
Figure 2:
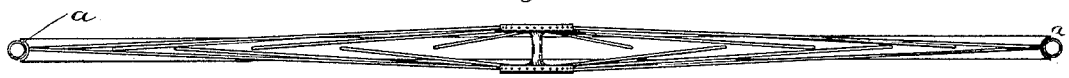

In the accompanying drawings, illustrating the mechanical features of my invention, Figure 1 is a side elevation of a bicycle-wheel, and Fig. 2 a vertical transverse section of the same with my improvements applied thereto. Fig. 3 is a side view of a carriage or wagon wheel provided with my invention. Fig. 4 is a vertical transverse section of a wagon or carriage wheel provided with my invention. Fig. 5 is a similar view of a modification.

In applying and adapting my invention to a bicycle or tricycle I employ a tubular ring of india-rubber or other suitable material having sufficient flexibility to be capable of inflation or expansion under an inflow of air, gas, or other fluid, and having sufficient strength, tenacity, toughness, and body to withstand wear, friction, abrasion, and other such rough usage without rupture as a wheel rolling upon a roadway is usually subject to.

In the drawings, $a$ designates the tubular ring, as above described. As will be understood, this ring is air-tight, while for the purposes of filling or inflation it is provided with a small branch tube, $b$, conveniently passed through an opening in the metallic rim $c$ of the wheel and provided with a suitable valve or cock, $e$, for controlling the inlet-passage.

The tube or ring $a$ may be filled with air or inflating-fluid to any desired or safe degree of pressure, and I intend that the pressure shall be sufficient to keep the walls of the ring forcibly expanded.

The walls of the ring or tube when so expanded will yield to the impact of projecting obstacles, impediments, or irregularities upon the surface, and will allow the wheel to ride over the same without jarring, jolting, or causing any irregularity or unevenness in the movement of the vehicle.

Pebbles, stones, ridges on the surface, and the like will simply indent the cushion-like surface of the ring while the latter is in contact, and when the obstacle is passed the ring will resume its normal shape.

In applying the inflated ring to the wheels of an ordinary vehicle—such as a carriage or wagon—special provision is to be made for securing the ring in place, as such wheels are provided with flat or convex tires or rims. In Fig. 4 I have shown an expedient which may be conveniently used for the purpose.

The inflated or inflatable ring in this instance consists of a web of india-rubber or other suitable material, $d$, having its edges pinched and secured between the walls of flanges $d'$, formed on the edges of a metallic ring or hoop, $e$. These flanges are formed by bending and folding the metal upon itself and project inwardly from the periphery of the hoop.

When the device is applied to a wheel in the course of construction, the fellies of the latter are readily fitted to the hoop $e$ and are embraced by the flanges $d'$. When the device is to be applied to a wheel already made, a filling consisting of segments of wood or other material, as shown at G, Fig. 5, should be arranged between the rim or tire of the wheel and the hoop $e$. These segments are flanged on one side, as shown at $g$, so as to abut against one side of the rim of the wheel, and when in place are secured to the wheel by cleats $g'$ or other suitable fastenings. Any other convenient method of securing the hoop and inflatable ring to a wheel may be adopted.

The inflatable ring or tube and its metallic hoop may be applied to the wheel of bicycles, tricycles, and other vehicles by using suitable fastening devices.

The flexible ring or tube may be either made in one or more layers or re-enforced at any desired points. It may also consist of one or more materials or of different qualities of material.

Having described my invention, what I claim as new, and desire to secure by Letters Patent, is—

1. A wheel provided with an inflatable tire having the sides or edges thereof secured between the double walls of the flanges of a rim or felly, substantially as and for the purposes set forth.

2. A wheel provided with an inflatable flexible tire having the sides thereof pinched and secured between the walls of flanges formed with a rim or felly and the flanges projecting inwardly from the periphery of said rim or felly, substantially as and for the purposes set forth.

3. A wheel provided with an inflatable flexible tire having the sides or edges secured between the walls of flanges mounted on a filling consisting of segments of wood or other material arranged between the rim and hoop of the wheel and said segments flanged so as to abut against one side of the rim, and means, as described, for securing the same to the wheel, substantially as described, and for the purposes set forth.

4. A wheel provided with a tire composed of a web of flexible material having the sides or edges secured between the walls of flanges formed with a rim and a tube provided with a cock for permitting of the inflation of said tire, substantially as described, and for the purposes set forth.

In testimony that I claim the foregoing I have hereunto set my hand this 3d day of December, 1887.

AMOS W. THOMAS.

Witnesses:
THOS. A. CONNOLLY,
R. DALE SPARHAWK.